(12) United States Patent
Xu

(10) Patent No.: US 7,981,201 B2
(45) Date of Patent: Jul. 19, 2011

(54) DE-ENTRAINMENT DEVICE

(75) Inventor: Zhanping Xu, East Amherst, NY (US)

(73) Assignee: UOP LLC, Des Plaines, IL (US)

(*) Notice: Subject to any disclaimer, the term of this patent is extended or adjusted under 35 U.S.C. 154(b) by 115 days.

(21) Appl. No.: 12/391,526

(22) Filed: Feb. 24, 2009

(65) Prior Publication Data

US 2010/0162890 A1    Jul. 1, 2010

Related U.S. Application Data

(60) Provisional application No. 61/141,754, filed on Dec. 31, 2008.

(51) Int. Cl.
*B01D 47/00* (2006.01)

(52) U.S. Cl. .............. 96/296; 96/300; 96/362; 261/113; 261/114.5

(58) Field of Classification Search .............. 96/296, 96/300, 362, 361, 355; 261/113, 114.5
See application file for complete search history.

(56) References Cited

U.S. PATENT DOCUMENTS

| | | | | |
|---|---|---|---|---|
| 5,158,713 | A | 10/1992 | Ghelfi et al. | 261/97 |
| 5,645,770 | A | 7/1997 | McNulty et al. | 261/97 |
| 6,059,272 | A | 5/2000 | Potthoff et al. | 261/97 |
| 6,502,806 | B2 | 1/2003 | Richardson | 261/97 |
| 6,682,633 | B1 | 1/2004 | Xu et al. | 203/1 |
| 7,112,312 | B2 | 9/2006 | Chou | 422/220 |
| 7,125,004 | B2 | 10/2006 | Dollie et al. | 261/97 |
| 7,137,622 | B2 | 11/2006 | Buchanan | 261/114.1 |
| 7,276,215 | B2 | 10/2007 | Müller | 422/224 |
| 2007/0137482 | A1 | 6/2007 | Xu et al. | 95/198 |

OTHER PUBLICATIONS

Zhanping Xu et al., "SimulFlow™ Device—Capacity Beyond System Limit," UOP LLC, 175 E. Park Dr., Tonawanda, NY 14050-0986 and UOP LLC, 13105 Northwest Freeway, Suite 600, Houston, TX 77040-6312.

Zhanping Xu et al., "High Capacity Co-Current Flow Distillation Internals," UOP LLC, 175 E. Park Dr., Tonawanda, NY 14150 and UOP LLC, 25 E. Algonquin Rd., Des Plaines, IL 60017-5017.

Christensen, G., "Cocurrent Downflow of Air and Water in a Two-Dimensional Packed Column," AIChE Journal, v 32, n 10, Oct. 1986, pp. 1677-1689.

(Continued)

*Primary Examiner* — Duane Smith
*Assistant Examiner* — Tiffany N Palmer
(74) *Attorney, Agent, or Firm* — Mark Goldberg

(57) ABSTRACT

De-entrainment devices for effectively removing entrained liquid from a vapor stream are disclosed. These de-entrainment devices are effective in distillation columns and other apparatuses comprising vapor-liquid contacting devices. Particular representative applications for these de-entrainment devices are in distillation (or fractionation) columns having co-current contacting modules, in which liquid and vapor enter into co-current flow channels of the modules. The de-entrainment devices can be used, for example, with non-parallel contacting stages or other types of high capacity trays.

17 Claims, 8 Drawing Sheets

OTHER PUBLICATIONS

Maiti, R.N. et al., "Gas-Liquid Distributors for Trickle-Bed Reactors: A Review," Industrial and Engineering Chemistry Research 46(19) 2007, pp. 6164-6182, American Chemical Society.

D. William Tedder et al., "Improving Hydraulics and Efficiencies with the T-By Sieve Tray," School of Chemical Engineering, Georgia Institute of Technology, Atlanta, GA 30332; Dept. of Chemical Engineering, Separations Research Program, University of Texas, Austin, TX 78712, 3UNI-FRAC, Inc., Salt Lake City 84119, AIChE Journal vol. 39, Issue 4, pp. 569-580, published online Jun. 17, 2004.

Trutna, W., "Cocurrent Contactor Raises [Distillation] Column Throughput," University of Texas Center for Energy Studies, Chemical Engineering (ISSN 0009-2460) V98 N.2 pp. 19-20 (Feb. 1991) chemical Week Associates.

Jacobs, G.E. et al., "Evaluating Liquid Distributors in Hydroprocessing Reactors," Hydrocarbon Processing 79(11) 2000 pp. 76-78 808284.

Boniface, A, "(Distillation Liquid and Vapor) Distributors," The Chemical Engineer (ISSN 0302-0797) N. 469 pp. 19, 21, 23-24 (Feb. 1990) Institution of Chemical Engineers.

Bolles, William L. "Multipass Flow Distribution and Mass Transfer Efficiency for Distillation Plates," Monsanto Company, 800 N. Lindbergh Blvd., St. Louis, Missouri 63166; AIChE Journal vol. 22, Issue 1, pp. 153-158, published online Jun. 17, 2004.

Siegel, M.H. et al., "An Air-Lift Reactor Analysis the Interrelationships Between Riser, Downcomer, and Gas-Liquid Separator Behavior, Including Gas Recirculation Effects," AIChE Journal, v 32, n 10, Oct. 1986, pp. 1677-1689.

DE-ENTRAINMENT DEVICE

CROSS-REFERENCE TO RELATED APPLICATIONS

This application claims the benefit of priority of U.S. Provisional Application Ser. No. 61/141,754, filed Dec. 31, 2008, hereby incorporated by reference in its entirety.

FIELD OF THE INVENTION

The invention relates to contacting apparatuses for performing vapor-liquid contacting such as in fractional distillation or other mass and/or heat transfer operations. The invention more specifically relates to de-entrainment devices for separating liquid that is entrained in a vapor stream, particularly in apparatuses used for high capacity vapor-liquid contacting.

DESCRIPTION OF RELATED ART

Vapor-liquid contacting devices, such as fractionation trays and packings, are employed to perform a wide variety of separations, particularly in the petroleum and petrochemical industries. Fractionation trays, for example, are used separating hydrocarbons into fractions having a similar relative volatility or boiling point. These fractions include crude oil-derived products of petroleum refining and petrochemical processing, such as naphtha, diesel fuel, LPG, and polymers. In some cases, trays are used to separate specific compounds from others of the same chemical or functional class, for example alcohols, ethers, alkylaromatics, monomers, solvents, inorganic compounds, etc. Trays are also used in gas processing and absorptive separation operations. A wide variety of trays and other contacting devices having differing advantages and drawbacks have been developed.

Fractionation trays and packings are the predominant forms of conventional vapor-liquid contacting devices used in distillation apparatuses, for example, in the applications described above. In the case of trays, a typical fractionation column will utilize about 10 to 250 of these contacting devices, depending on the ease of the separation (relative volatility difference) and desired product purity. Often the structure of each tray in the column is similar, but it is also known that the structures may differ (e.g., alternate) with respect to vertically adjacent trays. Trays are mounted horizontally, normally at a uniform vertical distance referred to as the tray spacing of the column. This distance may, however, vary in different sections of the column. The trays are often supported by rings welded to the inner surface of the column wall.

Fractional distillation has traditionally been conducted in cross flow or counter current contacting devices having an overall downward liquid flow and upward vapor flow. At some point in the apparatus the vapor and liquid phases are brought into contact to allow the vapor and liquid phases to exchange components and achieve, or approach as closely as possible, vapor-liquid equilibrium with each other. The vapor and liquid are then separated, moved in their respective directions, and contacted again with another quantity of the appropriate fluid at a different stage. In many conventional vapor-liquid contacting devices, vapor and liquid are contacted in a cross flow arrangement at each stage. An alternative apparatus differs from traditional multi-stage contacting systems in that while the overall flow in the apparatus continues to be countercurrent, each stage of actual contacting between the liquid and vapor phases is at least partially performed in a co-current mass transfer zone.

During fractional distillation processes using conventional trays, vapor generated at the bottom of the column rises through a large number of small perforations spread over the decking area of the tray, which supports a quantity of liquid. The passage of the vapor through the liquid generates a layer of bubbles referred to as froth. The high surface area of the froth helps to establish a compositional equilibrium between the vapor and liquid phases on the tray. The froth is then allowed to separate into vapor and liquid. During mass transfer, the vapor loses less volatile material to the liquid and thus becomes slightly more volatile as it passes upward through each tray. Simultaneously the concentration of less volatile compounds in the liquid increases as the liquid moves downward from tray to tray. The liquid separates from the froth and travels downward to the next lower tray. This continuous froth formation and vapor-liquid separation is performed on each tray. Vapor-liquid contacting devices therefore perform the two functions of contacting the rising vapor with liquid and then allowing the two phases to separate and flow in different directions. When the steps are performed a suitable number of times on different trays, multiple equilibrium stages of separation can be achieved, leading to the effective separation of chemical compounds based upon their relative volatility.

Many different types of vapor-liquid contacting devices including packings and trays have been developed in an effort improve such separations. Different devices tend to have different advantages. For instance, multiple downcomer trays have high vapor and liquid capacities and the ability to function effectively over a significant range of operating rates. Structured packings tend to have a low pressure drop, making them useful in low pressure or vacuum operations. Perforated decks are efficient contacting devices, but can cause high pressure drop in a column, especially when used in a relatively small deck area, even if the fractional open area is high. Two important parameters used to evaluate the performance of any vapor-liquid contacting device are capacity and efficiency. Both of these, however, may be compromised if a significant amount of liquid is entrained in rising vapor, for example, from a reboiler return or middle feed stream inlet to an upper vapor-liquid contacting device.

Particular examples of known vapor-liquid contacting devices include, for example, those described in U.S. Pat. No. 6,682,633 for co-current contacting of vapor and liquid in a number of structural units which are placed in horizontal layers. U.S. Pat. No. 5,837,105 and related U.S. Pat. No. 6,059,934 disclose a fractionation tray having multiple co-current contacting sections spread across the tray.

Other devices and apparatuses incorporating these devices, which address the issues discussed above and other considerations, are described in U.S. Pat. No. 7,424,999, hereby incorporated by reference. These devices are contacting modules in horizontal stages and differ from a conventional tray-like construction. The modules of one stage are rotated to be non-parallel with respect to the modules of an inferior stage, a superior stage, or both. The contacting modules include at least a liquid distributor (downcomer) and a demister (vapor-liquid separator) which together define a contacting volume, namely a co-current flow channel. Ascending vapor enters the contacting volume and entrains liquid that is discharged from the liquid distributor. The ascending vapor and entrained liquid are carried co-currently in the contacting volume to the demister, which partitions or separates the vapor and liquid such that these streams can separately flow upward and downward, respectively, after contact. Liquid exiting the demister flows onto a receiving pan and is then directed downward through a duct. Each of the ducts associated with a single receiving pan direct the liquid into a separate downcomer of an inferior contacting stage. Vapor exiting the demister flows to a fluid transfer volume above the receiving pan and then into the contacting volume of a superior contacting stage.

In distillation columns and other apparatuses (e.g., absorption and quench towers) having vapor-liquid contacting devices, the entrainment of liquid in a rising vapor stream is not desirable in all sections of the column or apparatus. For example, vapor from a feed or reboiler return often contains entrained liquid having a composition that is not representative of that associated with the contacting stage of the apparatus. The upward entrainment of such liquid is therefore detrimental to the overall operation of the column or other apparatus, as this results in lost column capacity due to the increased liquid traffic through a contacting stage, as well as lost efficiency due to entrained liquid being mis-representative in composition of the contacting stage to which it is directed. These detrimental effects of liquid entrainment can become especially problematic in columns or apparatuses containing high capacity devices, such as those described in U.S. Pat. No. 7,424,999, in which high vapor superficial velocities greatly increase the difficulty of separating entrained liquid from vapor by gravity.

There is consequently a need in the art for devices that can effectively de-entrain or separate entrained liquid, particularly in specified portions of columns or other apparatuses containing vapor-liquid contacting devices, and especially high capacity devices. Often, the need for such de-entrainment devices is significant in distillation column bottoms sections that communicate with a reboiler return line, as well as sections near the introduction of a feed stream, which may comprise both vapor and liquid fractions at the point of introduction.

SUMMARY OF THE INVENTION

The present invention is associated with the discovery of de-entrainment devices for effectively removing entrained liquid from a vapor stream. These de-entrainment devices are effective in distillation columns and other apparatuses comprising vapor-liquid contacting devices. Particular representative applications for these de-entrainment devices are in distillation (or fractionation) columns having co-current contacting modules such as those described in U.S. Pat. No. 7,424,999, in which liquid and vapor enter into co-current flow channels of the modules. The modules can be used, for example, in non-parallel contacting stages having structures for transferring liquid from one stage to the next inferior stage without reducing liquid handling capability. The modules provide an efficient usage of column space for fluid flow and contacting, in order to achieve high capacity, high efficiency, and low pressure drop.

These advantages of the modules, and particularly the high vapor and liquid flows associated with their service, can also complicate the ability to de-entrain unwanted liquid if desired, for example, when the composition of entrained liquid does not approximate that associated with the contacting stage. This compositional mis-match can occur, for example, when liquid is entrained upwardly from an inferior contacting stage or a flow (line or pipe) that is external to the column, such as a feed or reboiler return, as discussed above. The upward entrainment of such liquid also increases liquid traffic through the contacting stage to which it is directed and results in lost column capacity. To address the losses in vapor-liquid contacting capacity and efficiency and overall performance of the apparatus, effective de-entrainment devices are needed.

These de-entrainment devices can be positioned in any section of a distillation column or other vapor-liquid contacting apparatus in which it is desired to de-entrain liquid. One section of particular interest is in the column bottoms section, in which de-entrainment of entrained liquid rising from a reboiler is often beneficial. Advantageously, the de-entrainment devices may be designed for compatibility with the types of vapor-liquid contacting devices used in many cases throughout a distillation column. For example, a representative de-entrainment device may comprise a de-entrainment stage having a de-entrainment module that is in non-parallel alignment with, for example rotated with respect to, an immediately superior, lower contacting module, in an apparatus comprising a plurality of stages with contacting modules also in a similar, non-parallel alignment. Advantageously, structures such as ducts from the lower contacting module may engage or be in fluid communication with the de-entrainment device. Alternatively, the de-entrainment device may be configured for compatibility with other high capacity vapor-liquid contacting devices including MD™ trays, ECMD™ trays, or conventional multiple-pass trays, such that the liquid recovered from these devices is directed to downcomers of the de-entrainment device, which bypass de-entrainment flow channels.

Aspects of the invention pertain particularly to de-entrainment devices of a modular construction, in which it is possible for liquid introduced into inlets of a liquid distributor or downcomer of a de-entrainment module, from the immediately superior stage, to bypass de-entrainment flow channels, which would otherwise serve as co-current flow channels in the absence of a suitable liquid conduit that provides the desired bypass. The downcomer may be integral with the conduit or plurality of conduits (i.e., the downcomer and conduit(s) may be formed as one piece or may be welded, bolted, banded, or otherwise fastened or affixed (e.g., in a sealing manner)). According to an alternative embodiment, the downcomer may feed or be in liquid communication with one or a plurality of conduits without being physically attached. For example, an outlet of the downcomer may be proximate the conduit(s) in order to discharge liquid into the conduits from above the conduits or from within the conduit(s) (e.g., in the case where the downcomer has an outlet inside the inlet of the conduit(s)).

According to representative embodiments, the conduits extend vertically through the de-entrainment flow channels a sufficient distance to avoid significant contact of liquid flowing through the downcomer of the de-entrainment module with rising vapor. The conduits preferably extend below liquid receiving pans of the de-entrainment stage such that liquid from the downcomer, which might normally be discharged through an outlet into the bottom of a co-current flow channel (in the case of co-current vapor-liquid contacting devices), effectively bypasses this de-entrainment flow channel. In a representative embodiment, the conduits extend below the receiving pan to a depth that is at least equal to the height of the de-entrainment module, as measured from a level (e.g., a bottom vertical position) corresponding to the plane of the receiving pan(s) to a level (e.g., a top vertical position) corresponding to the top of the demister(s) or demister row(s). In other embodiments, the depth to which the conduits extend is at least 25% (e.g., from about 25% to about 500%), at least 50% (e.g., from about 50% to about 300%), or at least 75% (e.g., from about 75% to about 150%) of this height. The conduits may have a number of possible cross-sectional shapes, including a circle, oval, rectangle (e.g., square), or polygon.

Embodiments of the invention therefore relate to de-entrainment devices that can be used, for example, in high capacity vapor-liquid contacting applications (e.g., fractionation columns and other vapor-liquid contacting apparatuses). According to one embodiment, the de-entrainment device, for disengaging entrained liquid (e.g., at a distillation column bottoms section) comprises a de-entrainment stage having at least one de-entrainment module. This module comprises at least one downcomer integral with, or having an outlet proximate, a conduit that bypasses a de-entrainment flow channel. The conduits may be further characterized as discussed above. The module also includes a demister having an inlet surface proximate the de-entrainment flow channel and an outlet surface superior to a receiving pan, as well as at least one duct having an upper end in fluid communication with the receiving pan.

In another embodiment, the de-entrainment stage has, in addition to the de-entrainment module, a plurality of receiving pans. The de-entrainment module comprises a pair of substantially parallel demisters being spaced apart and a downcomer located between the demisters and integral with, or having an outlet proximate, a conduit bypassing a pair of de-entrainment flow channels. This embodiment may be characterized by (i) the inlet surfaces of the demisters being in fluid communication with the de-entrainment flow channels, (ii) the demisters having outlet surfaces superior to separate receiving pans of the plurality of receiving pans of the de-entrainment stage, and/or (iii) each receiving pan having at least one duct.

Other embodiments of the invention relate to vapor-liquid contacting apparatuses (e.g., distillation or fractionation columns) comprising any of the de-entrainment devices discussed above. According to a particular embodiment, the de-entrainment device is positioned below a lower contacting stage having a lower contacting module (e.g., a high capacity vapor-liquid contacting module). The lower contacting module may be rotated with respect to the de-entrainment module, for example in a non-parallel alignment with a degree of rotation (e.g., 90° or orthogonal) that is equal to a degree of rotation between other vapor-liquid contacting modules of adjacent stages within the apparatus. Differing degrees of rotation may also be used.

In a representative embodiment in which a de-entrainment device is used in combination with a lower (or inferior stage), high capacity contacting module, this lower contacting module comprises at least one downcomer having an outlet proximate at least one co-current flow channel, as well as a demister having an inlet surface proximate the co-current flow channel and an outlet surface superior to a receiving pan. The lower contacting module also has at least one duct with an upper end in fluid communication with the receiving pan, and a lower end. Advantageously, the lower end of each duct of this lower contacting module may be in fluid communication and therefore engage a separate downcomer of the de-entrainment device (e.g., such that the lower contacting module is arranged to feed liquid into the de-entrainment module of the de-entrainment device).

In another representative embodiment, this lower contacting module comprises a pair of substantially parallel demisters being spaced apart and a downcomer located between the demisters and defining, with inlet surfaces of the demisters, a pair of co-current flow channels. According to this embodiment, the inlet surfaces of the demisters are in fluid communication with the co-current flow channels, the downcomer has an outlet in fluid communication with the co-current flow channels, and the demisters have outlet surfaces superior to separate receiving pans of the lower contacting stage. Each receiving pan has at least one duct, with each duct of one receiving pan providing fluid communication to a downcomer of the de-entrainment module.

Representative de-entrainment devices advantageously have a modular structure, with the number of modules being mainly determined by the size (e.g., column diameter) of the vessel in which it is used as well as the fluid rates and properties encountered in normal service. De-entrainment stages according to any of the embodiments described above comprise at least one module (e.g., 1, 2, 3, 4, 5, 6, 7, 8, 9, or 10 modules), each having a downcomer associated with two demisters. Representative de-entrainment stages have modules in a parallel, alternative arrangement with receiving pans, where the number of receiving pans in a stage will generally exceed the number of downcomers by one, due to the placement of terminal receiving pans on both ends of each stage.

Further embodiments of the invention relate to methods for contacting vapor and liquid streams comprising passing the streams through a co-current flow channel in an apparatus comprising a de-entrainment device as described herein. Advantageously, the use of the de-entrainment device complements high efficiency, high capacity vapor-liquid contacting modules with respect to its ability to handle high vapor and liquid loads with a high de-entrainment efficiency (i.e., separation of entrained liquid from rising vapor), while occupying a relatively small column space.

These and other embodiments relating to the present invention are apparent from the following Detailed Description.

The same reference numbers are used to illustrate the same or similar features throughout the drawings. The drawings are to be understood to present an illustration of the invention and/or principles involved. As is readily apparent to one of skill in the art having knowledge of the present disclosure, apparatuses, de-entrainment modules, or associated equipment, according to various other embodiments of the invention will have configurations and components determined, in part, by their specific use.

DETAILED DESCRIPTION

Figure 1:
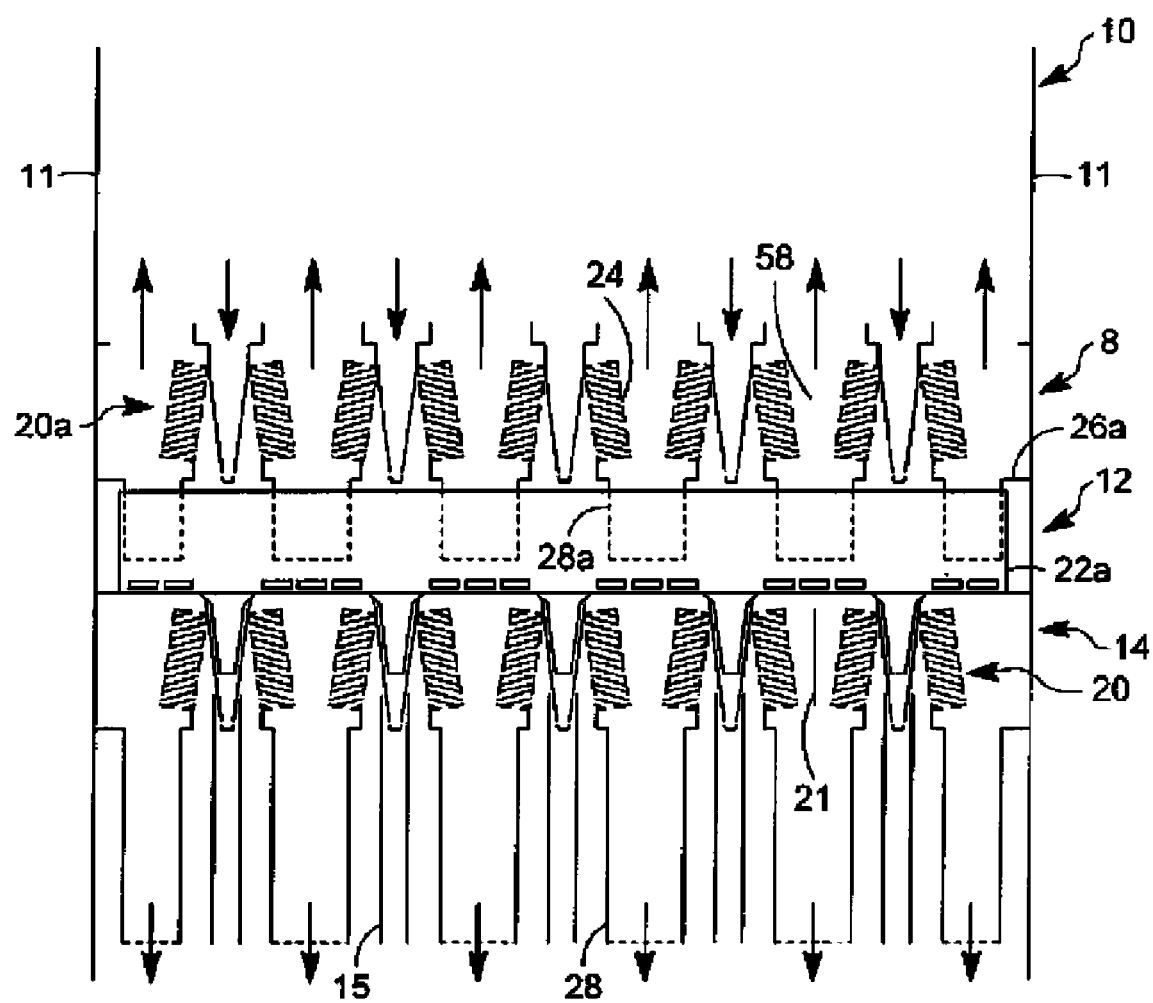
FIG. 1 is a cross-sectional schematic of a representative apparatus comprising contacting stages with contacting modules, with a lower contacting stage and a de-entrainment stage.

FIG. 1 illustrates a co-current vapor-liquid contacting apparatus according to the present invention, comprising stages within a vessel 10, including intermediate contacting stage 8, lower contacting stage 12, and de-entrainment stage 14. The vessel 10 may be for example a distillation column, absorber, direct contact heat exchanger, or other vessel used to conduct vapor-liquid contacting. The vessel 10 contains lower contacting and de-entrainment stages 12 and 14, respectively, and optional collector/distributors. A fractionation or distillation column typically contains from about 10 to about 250 or more contacting stages similar or identical to lower contacting stage 12 and may have one or more de-entrainment stages 14 depending on the need to separate liquid entrained in any particular section of the column, as discussed above. A common location for de-entrainment stage 14 is below a column section (e.g., above a middle feed introduction) of the column or the column bottoms, and particularly adjacent a reboiler return. A de-entrainment stage may also be used adjacent any inlet stream such as a column feed stream. The design of de-entrainment modules 20 of these stages may be essentially uniform across the de-entrainment stage, but de-entrainment modules 20 may also vary in width and/or height. For simplicity, only three stages are shown in FIG. 1, namely intermediate contacting stage 8 and lower contacting stage 12, with de-entrainment stage 14 in this embodiment being positioned below lower contacting stage 12.

It is understood that an apparatus such as a distillation column may contain several sections, with each section having numerous contacting stages. Also, there may be a plurality of fluid feed introductions and/or fluid product withdrawals between and/or within sections. Other contacting devices (e.g., trays and/or packings) used in distillation may be mixed in the same and/or different sections of the apparatus (e.g., above and/or below), as the sections having contacting stages or de-entrainment stages described herein. Representative contacting devices include MD™ trays, ECMD™ trays, and multiple-pass trays. The vessel 10 includes an outer shell 11 that typically has a cylindrical cross section.

According to FIG. 1 each adjacent contacting stages 8 and 12 (in a superior/inferior stage relationship) have a 90° rotation with respect to one another, thereby distributing liquid in a direction that is orthogonal to the immediately adjacent stage to reduce liquid maldistribution. In other embodiments, vertically adjacent contacting stages may be oriented with different degrees of rotation that may be the same from stage to stage or may vary. Each contacting stage 8, 12 comprises one or a plurality of contacting modules 20a and receiving pans 26a. Likewise, each de-entrainment stage 14 comprises at least one de-entrainment module 20 and adjacent receiving pans 26.

Figure 2:
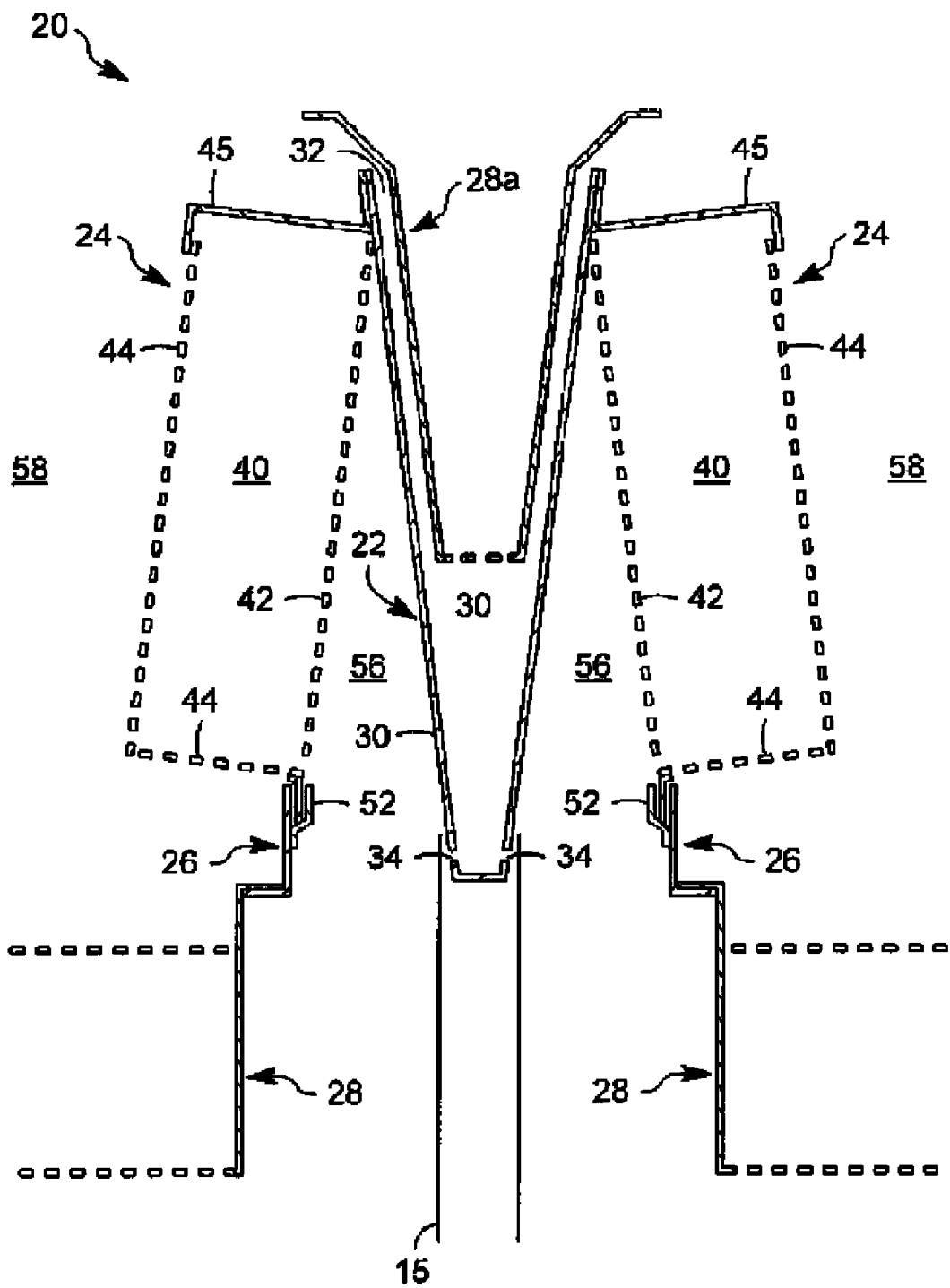
FIG. 2 is a cross-sectional schematic of a representative individual de-entrainment module.
Figure 4:
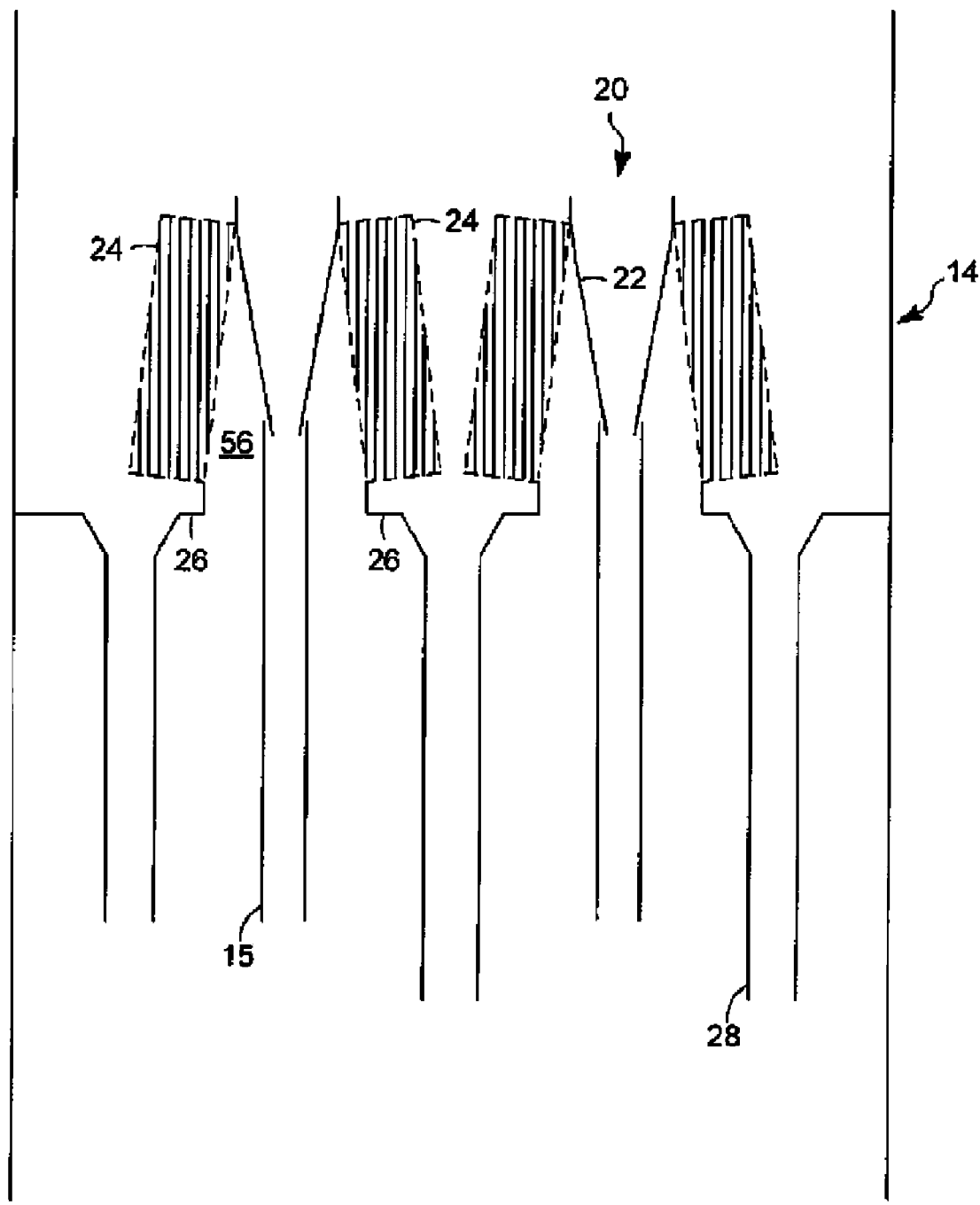
FIG. 4 is a cross-sectional schematic of an apparatus, depicting a de-entrainment stage comprising two de-entrainment modules and associated components.

As shown in FIGS. 2 and 4, de-entrainment modules 20 may include a liquid distributor or downcomer 22, which may have a similar or identical structure with respect to downcomer 22a in a contacting stage 12 of FIG. 1 that is not a de-entrainment stage. In either case, downcomer 22 is located between a pair of vapor-liquid separators or demisters 24. The downcomer 22 and demisters 24 cooperate to define a de-entrainment flow channel 56. Downcomer 22 is proximate conduit 15, which allows liquid discharged from outlet(s) 34 of downcomer 22 to bypass de-entrainment flow channel 56. This prevents liquid from entering this channel and combining with liquid that is already present in upwardly flowing vapor in this channel, which de-entrainment module 20 is designed to separate or de-entrain. As discussed above, downcomer 22 may be integral with conduit 15 (i.e., formed as a single piece or attached, for example, in a sealing manner).

Otherwise, the downcomer 22 can be separate from conduit 15 as shown in FIG. 2 and formed, for example, with an outlet 34. In the case of a separate conduit, outlet 34 of downcomer may comprise one or a plurality of slots, perforations, or other types of openings arranged in one or more rows near the bottom of the downcomer 22. The separation of conduit 15 from downcomer 22 is an option which can provide venting of conduit 15 that is used in this configuration. The downcomer outlet 34 may be located in the sidewalls 30 and/or the bottom of the downcomer, such that downcomer outlet 34 is proximate conduit 15 and provides fluid communication between downcomer 22 and conduit 15. As is illustrated in FIG. 2, outlet 34 of downcomer 22 is actually below the top of conduit 15, such that outlet 34 is within conduit 15. According to other embodiments, outlet 34 may be above conduit 15 but positioned such that a majority, substantially all, or all of the liquid discharged from outlet 34 flows into conduit 15 and thereby bypasses de-entrainment flow channel 56. It is also possible for conduit 15 to have an upper end that is flared or has a funnel configuration to help direct liquid exiting downcomer 22 into conduit 15.

In addition to de-entrainment modules 20, each de-entrainment stage may also include one or a plurality of receiving pans 26, with each receiving pan 26 having one or a plurality of ducts 28. An inlet 32 to the downcomer 22 can be configured to engage the ducts 28a of a receiving pan of a vapor-liquid contacting stage (generally not a de-entrainment stage) that is immediately superior to the de-entrainment stage. As shown in FIG. 2, conduits 15 of a de-entrainment stage generally extend from above the level of receiving pan 26 of the de-entrainment stage (i.e., near outlet 34 of downcomer 22) to well below the level of this receiving pan, with representative depths of extension as discussed above. In representative embodiments, conduits 15 extend to a level that is substantially the same (e.g., from about 80% to about 120% or from about 90% to about 110%) as the depth to which ducts 28 of the receiving pan 22 of the de-entrainment stage extend. In apparatuses utilizing high capacity co-current contacting stages in combination with a de-entrainment stage, the conduits 15 and ducts 28 of the de-entrainment stage may extend a greater length than ducts or other liquid transfer components of one, some, or all of these contacting stages. For example, conduits 15 and ducts 28 may extend from above, to below, a reboiler return or middle feed stream inlet. The ducts 28 of the de-entrainment stage may also have a different configuration than ducts or other liquid transfer components of one, some, or all of the contacting stages, for example, to be suitably positioned about a distributor. Ducts 28 may, for example, have a different cross-sectional geometry and/or surface area or otherwise differ in number or placement.

Figure 3:
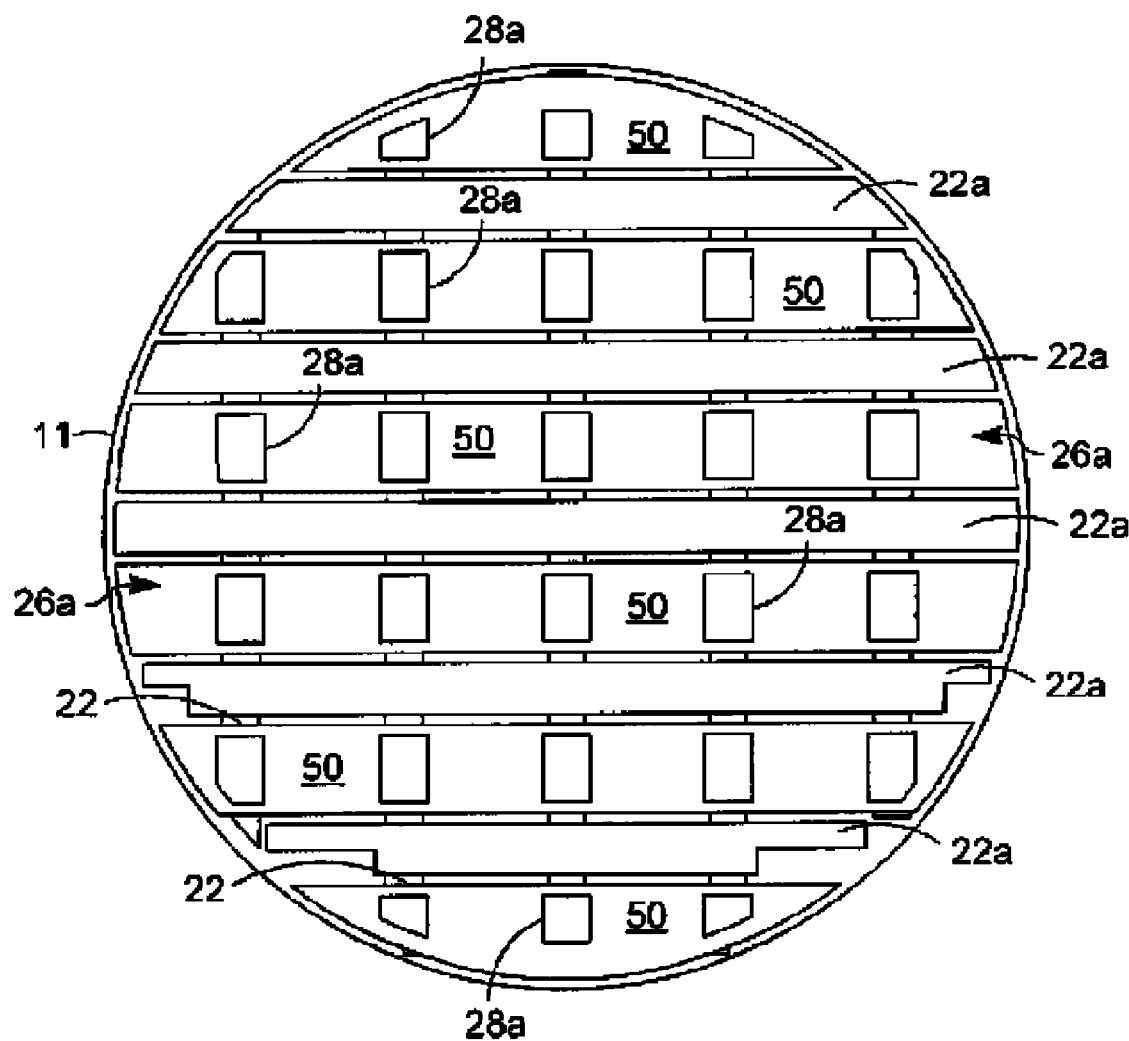
FIG. 3 is a top view of an individual, lower contacting stage.

FIG. 3 illustrates a top view of two adjacent (inferior and superior) stages, namely a superior, lower contacting stage and an inferior, de-entrainment stage, in which the demisters of the superior stage are not shown to more clearly demonstrate the arrangement of receiving pans 26a, ducts 28a, and downcomers 22a of the superior stage, and downcomers 22 of the inferior, de-entrainment stage. At the lower contacting stage (as well as the de-entrainment stage), receiving pans 26a are substantially parallel and are spaced apart across the cross sectional area of the apparatus or vessel. The downcomer 22a of lower contacting stage is located between each pair of adjacent receiving pans 26a of the same contacting stage, resulting in an alternating pattern of receiving pans 26a and contacting modules in the lower contacting stage. Downcomers 22a, 22 and the receiving pans 26a, 26 at each stage may be supported by support rings (not shown) affixed to the inner surface of the vessel wall or outer shell 11 by welding or other conventional means. The downcomers and their associated receiving pans at each stage may be bolted, clamped, or otherwise secured to the support ring to maintain them in a desired position or column height during operation and to prevent fluid leakage across the stages, outside of desired contacting areas.

Receiving pans located between two contacting modules (or between two de-entrainment modules in the case of the de-entrainment stage), and those located between a module and the vessel shell or outer wall, are referred to as central and terminal receiving pans, respectively. Central receiving pans are thus shared by two adjacent modules. In another embodiment (not illustrated) a pair of receiving pans is incorporated into each module. When such modules are arranged in a substantially parallel alignment across the stage, the modules are adjacent such that there are two receiving pans between each pair of adjacent downcomers. A vertical baffle 21 is optionally included between two adjacent contacting modules or de-entrainment modules, 20a or 20, of either a contacting stage or a de-entrainment stage, respectively, in order to intercept vapor emanating from the demisters 24 and, in general, to reduce any tendency of the emerging fluids to interfere with each other in a fluid transfer volume 58 above receiving pans 26 or 26a. The vertical baffle 21 may be situated between and substantially parallel to the demisters 24 of adjacent contacting modules 20a or 20, of a contacting stage or de-entrainment stage.

According to FIG. 2, downcomer 22, which fluidly communicates with conduit 15 to bypass de-entrainment flow channel 56, has an inlet 32 in an upper portion and an outlet 34 having one or more outlet openings in a lower portion. Two sloped downcomer sidewalls 30 taper the downcomer 22 in the downward direction. The bottom of the substantially V-shaped downcomer 22 near outlet 34 may be pointed, curved, or flat as shown in FIG. 2. Alternative embodiments having downcomers of various different shapes, such as stepped or sloped and stepped, are possible. In further embodiments, the cross sectional shape of the downcomer may be rectangular (e.g., square), or it may be curved, irregular, or otherwise configured to define a desired de-entrainment flow channel and geometry for accepting liquid-containing vapor therein. A V-shaped downcomer, as shown, provides a combination of a large de-entrainment volume between the demisters 24 and downcomer sidewalls 30 in the lower portion of de-entrainment stage 14 and a large downcomer inlet 32 in the upper portion for accommodating enlarged ducts 28a from above and increasing liquid handling capability.

For effective liquid de-entrainment by de-entrainment module 20, the introduction of vapor into either conduit 15 or duct 28 of should be minimized or avoided. In operation, if conduit 15 is not physically affixed to downcomer 22, then a liquid level in the downcomer 22 can provide a dynamic seal of downwardly flowing liquid to prevent the ascending vapor from entering the downcomer through outlet 34. The opening(s) of downcomer outlet 34 are preferably distributed along the length of the downcomer 22 and they may be arranged such that the openings are varied in size or number or eliminated in sections of the downcomer 22 that are not above or vertically aligned with a conduit 15. In the optional embodiment in which conduit 15 is attached to downcomer 22, then conduit 15 is itself sealed against vapor, for example, with a dynamic seal formed by a liquid level in conduit 15, in a similar manner to the dynamic seal as discussed above with respect to downcomer 22. Alternatively, the seal and prevention of vapor flow into conduit 15 is a static seal formed, for example, by extending conduit 15 into a liquid level such as a column sump or liquid trough of a liquid distributor. Likewise, duct 28 may be sealed (i) dynamically, for example, by limiting liquid spouts or other type(s) of liquid outlet area(s), in order to establish a liquid level in duct 28 and consequently the dynamic liquid seal, or (ii) statically by submerging duct 28 into a liquid level (e.g., a trough distributor). Otherwise, vapor flow into duct 28 may be prevented by a partial or complete sealing between duct 28 and a downcomer of an immediately inferior stage.

Demisters 24 generally run substantially along the length of downcomer 22 or 22a in rows on either side. Rows of demisters 24 may be assembled from a plurality of individual demister units 40 that include male and female end plates to form seals between the units and substantially prevent fluid leakage through the junction. Other ways to join units of demister rows include the use of suitable fasteners such as bolts, clips, pins, clamps, or bands. Mechanisms such as a male and female tab and slot combination can provide advantages for quick assembly and disassembly. Welding is also possible. The modular configuration of the demisters 24 allows a fabricator to produce demister units in one or a small number of standard sizes to be assembled into demister rows 24 of varying length. Some custom-sized demister units may be required for particularly short demister rows 24 or to match the length of a downcomer 22 depending on the dimensions of the apparatus and the variety of standard size demister units available. The modular design has the further advantage of easing the assembly of the de-entrainment module 20 since the demister units are lighter than an entire row of demisters formed of a single unit. However, according to some embodiments, a single demister unit can also be the complete demister 24.

Demisters 24 are used to de-entrain liquid droplets from a vapor stream. One example is a mist eliminator, such as a vane type demister having various channels and louvers such that the fluid stream passing through the demister must undergo several changes in direction, forcing entrained liquid droplets to impact portions of the separation structure and flow downward to the bottom of the demister. Examples separation structures for demisters (or vapor-liquid separation devices) are mesh pads or woven threads. Combinations of these structures can also be used. Many possible variations in the design of the separating structures in demister units 40 are possible, the important consideration being the effectiveness of these structures in separating entrained liquid from a flowing vapor stream. This effectiveness is thought to correlate with the number of obstructions in the fluid flow which cause liquid droplets to impact a solid surface. Structures having numerous dead ends may lead to the formation of relatively quiescent regions, also promoting liquid separation.

As shown in FIG. 2, various optional elements may cooperate with and/or be incorporated into the demister 24 to further improve the performance and/or structural integrity of the overall apparatus. For example, a perforated inlet plate 42 as an inlet surface, a perforated outlet plate 44 as an outlet surface, and an imperforate top plate 45 are shown. Perforated plates are one type of flow manipulator that may cooperate with the demister 24. Other non-limiting examples of flow manipulators for demister 24 include expanded metal, porous solids, mesh pads, screens, grids, mesh, profile wire screens, and honeycombs. It has been found that the fractional open area of the flow manipulators affect both separation efficiency and pressure drop of the demister 24. The fractional open area of the flow manipulators may vary on different sides and on the same side of the demister to optimize the separation efficiency and pressure drop of the demister 24. Various types of flow manipulators may be used in a single demister. In other embodiments, flow manipulators are not used on some or any of the inlet and outlet surfaces of the demister.

The perforated inlet plate or other flow manipulator at inlet surface 42 is proximate the downcomer 22. The perforated outlet plate 44 extends also the majority of the demister side opposite the perforated inlet surface 42 and along the bottom of the demister unit 40. The imperforate top plate 45 prevents liquid from leaving the demister unit 40 directly from the top and increases the vapor-liquid separation efficiency. The imperforate top plate 45 has bent strips on both sides, one following downcomer sidewall 30 for attaching with the wall and the other following the perforated outlet plate 44 of the demister 40 for connecting with the perforated outlet plate 44. It has been found that the imperforate strip extending down a distance from the top of the perforated outlet plate 44 also improves vapor-liquid separation efficiency. The strip typically extends to cover from about 5% to about 30%, and generally from about 10% to about 20%, of the height of the demister outlet.

The plurality of ducts 28a from a lower contacting stage extend through the receiving pan 26a of this stage and into the inlet 32 of a downcomer 22 of a de-entrainment stage. Each of the ducts 28a that extends through a particular receiving pan 26a directs liquid into a different downcomer 22 of the de-entrainment stage, as is best shown in FIG. 3. In this representative embodiment, the top of the duct 28a is flush with the horizontal surface 50 of the receiving pan 26a so that liquid may flow freely from the receiving pan 26a into the duct 28a without any obstruction. In other embodiments the ducts may hang from the receiving pan by having a lip that rests on the flat base 50 of the receiving pan when the ducts are fitted through the openings. The ducts may also be mounted to the underside surface of the receiving pans. Any conventional means of connecting the ducts and receiving pans may be used including but not limited to hanging, bolting, welding, and pressure fitting. Gaskets and/or sealants may be used to prevent leakage between the receiving pans and the ducts. In other embodiments the ducts may be at least partially defined by the portion of the flat base of the receiving pan that may be cut and folded or pushed out when the openings are formed. Further, the top mouth of the duct 28a may be enlarged and wider than downcomer inlet 32 of a de-entrainment stage, as shown in FIG. 2, to increase liquid handling capability and reduce choking tendency at the duct inlet. The sidewalls of the ducts 28a are sloped so that the ducts 28a fit within the downcomers 22 and leave a gap for easy installation and vapor venting, as shown in FIG. 2.

The volume between inlet surface 42 of demister 24 and the adjacent sidewall 30 of the downcomer 22 forms a de-entrainment flow channel 56, shown in FIG. 2, that is bypassed by downward flowing liquid in conduit 15. However, upflowing, co-current flows of vapor and liquid present from below the de-entrainment stage are separated by contacting of these flows in demister units 40. A perforated plate or other flow manipulator at inlet surface 42 of demister 24 improves fluid flow distribution through demister 24 and improves vapor-liquid separation. The volume above receiving pan 26 and between demister rows 24 that it supports defines fluid transfer volume 58. The rows of demisters 24 may be oriented at an angle from vertical as illustrated in FIG. 2 to provide improved geometries of de-entrainment flow channel 56, having a decreasing volume from bottom to top (to match decreasing vapor flow in this volume) and fluid transfer volume 58, having an increasing volume from bottom to top (to match increasing vapor flow in this volume).

The fluid flows through de-entrainment module 20 of de-entrainment stage 14 include liquid flow from a lower contacting stage 12 that is directed into the downcomer 22 by several receiving pans 26a of this contacting stage 12, in cooperation with ducts 28a of this stage. The liquid exits the downcomer 22 through outlet 34 and bypasses the de-entrainment flow channel 56 via conduit 15. The liquid entrained in vapor from below the de-entrainment stage, for example in vapor from a reboiler return, however, is carried upward by the rising vapor to the inlet surfaces 42 of the demister units 40. The vapor and liquid are separated by the separating structures, as discussed above, within demister units 40, such that the separated vapor exits demister units 40 predominantly through the outlet surface 44 into fluid transfer volume 58. The separated vapor then continues upward to a co-current flow channel of lower contacting stage 12. The separated liquid exits the demister units 40 through the bottom portion of outlet surface 44 and flows onto the receiving pan 26. The receiving pan 26 then directs the separated liquid into the plurality of ducts 28, each of which ducts 28 directs the liquid into a desired location, for example, a column sump.

According to other embodiments, in lieu of perforated inlet plates 42, a porous blanket layer such as mesh pad may be used to cover the inlet to the demister units 40. The use of this porous blanket has been found to improve vapor-liquid separation, especially during operation at higher vapor rates. The porous blanket can be of conventional mesh material used for liquid droplet de-entrainment or so called "mist eliminators." It will typically comprise very loosely woven strands forming a high surface area, low pressure drop blanket. The mesh blanket is for fine droplet coalescence and liquid distribution to the separator. An alternative construction involves mounting the mesh in an indentation in a separation structure inside a demister unit 40.

FIG. 4 depicts a de-entrainment device of a modular structure and having a de-entrainment stage 14, as described herein. The device of this embodiment has two de-entrainment modules 20, but the number of modules can vary and is mainly determined by the size (e.g., diameter) of the apparatus as well as rates and physical properties of the liquid and vapor streams in the apparatus. Each of the de-entrainment modules 20 has one downcomer 22, two demisters 24, and the associated receiving pans 26 and liquid conduits 15.

Figure 5:
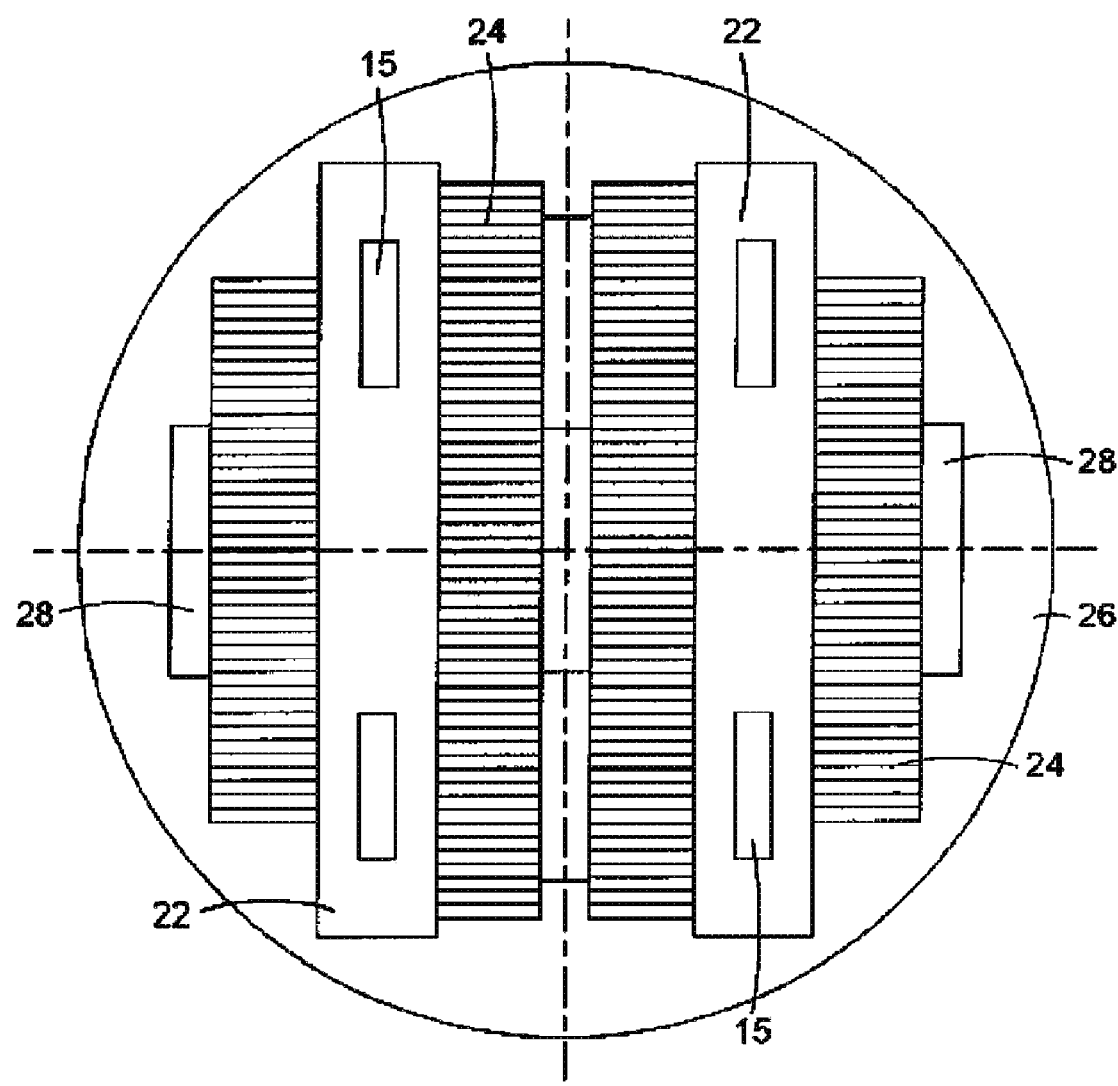
FIG. 5 is a top view of a de-entrainment stage.

FIG. 5 provides a top view of the de-entrainment stage, illustrating how downcomers 22, demisters 24, and receiving pans 26 are normally extended across the entire column cross section while conduits 15 attached to downcomers and ducts 28 attached to receiving pans may, as shown, be divided into a plurality of smaller units. Conduits 15 can be formed with various cross-sectional shapes and extend in various longitudinal directions to receive liquid from, and discharge liquid to, desired locations while bypassing contact with upwardly flowing vapor that would otherwise entrain the liquid in conduits 15.

Figure 6:
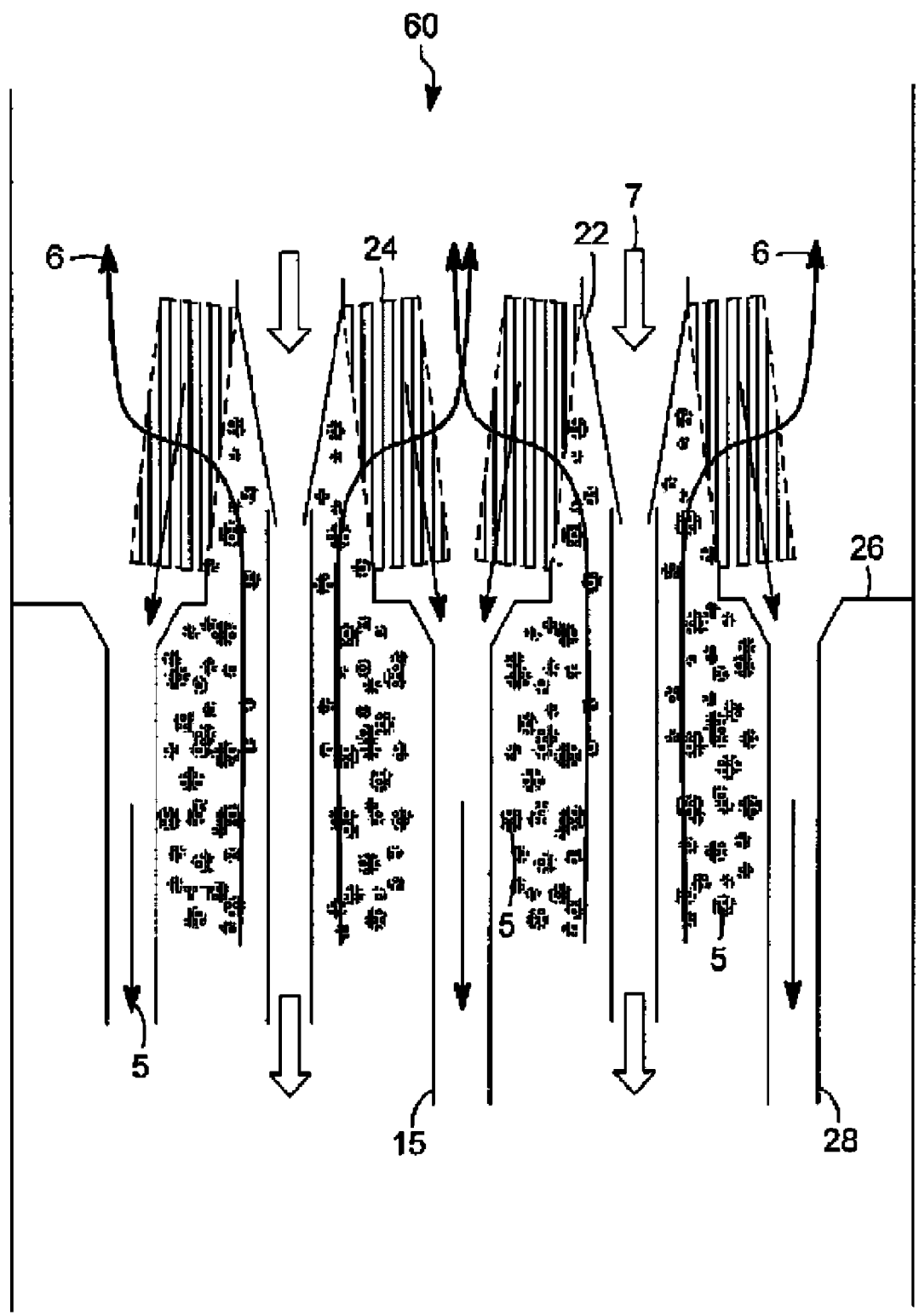
FIG. 6 depicts both entrained liquid and rising vapor flows through a de-entrainment flow channel.

FIG. 6 illustrates the flows, in a representative de-entrainment device 60, of entrained liquid droplets 5 that are separated in demisters 24 from its entraining vapor 6 after passing through de-entrainment flow channels, while liquid stream 7 flowing from a superior contacting stage (not shown) enters downcomers 22 and bypasses these de-entrainment flow channels via conduits 15. Downcomers 22 may be opened, for example, with at least one slot for discharging liquid stream 7 into conduits 15. The vapor 6 and its entrained liquid droplets 5 flow upward through the de-entrainment channel and then across the demisters 24. The entrained liquid 5, after being separated from vapor 6, falls onto receiving pan 26. Conduits 15 in fluid communication with downcomers 22 direct liquid stream 7 to desired locations below the de-entrainment device 60.

Figure 7:
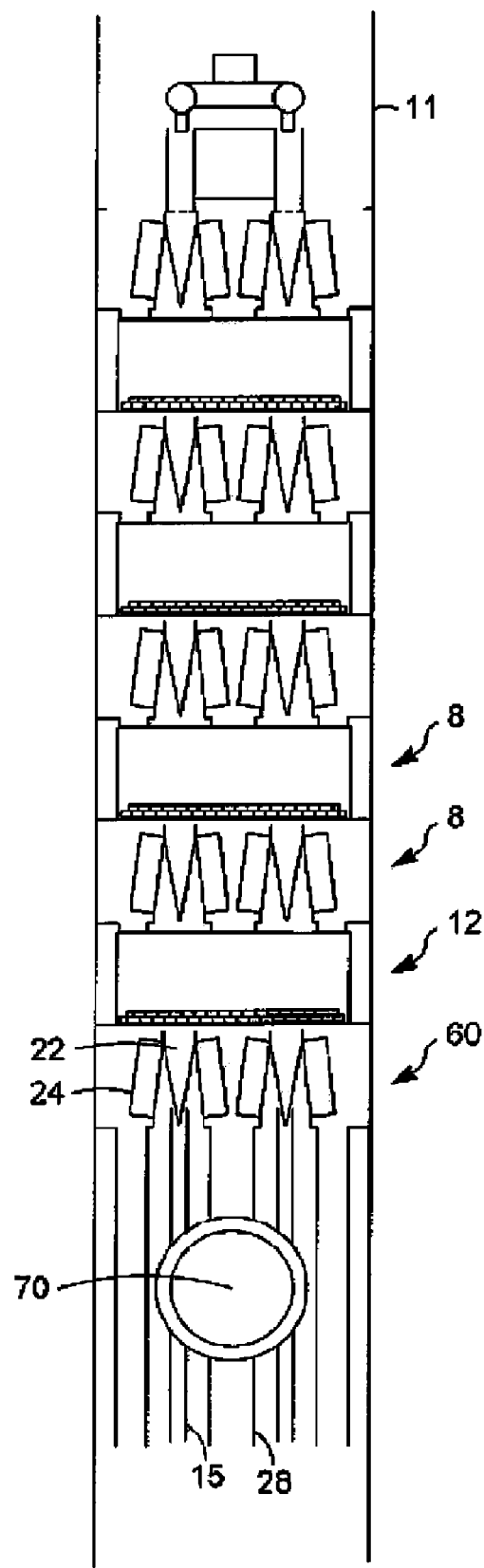
FIG. 7 depicts a distillation column with vapor-liquid contacting stages and a de-entrainment device having a de-entrainment stage at the bottom of the column.

FIG. 7 depicts a de-entrainment device 60, such as the one shown in FIG. 6, installed in a vessel 11. In the illustrated embodiment, de-entrainment device 60 is installed below a lower contacting stage 12 and several intermediate contacting stages 8. De-entrainment device 60 removes liquid from upwardly rising vapor from a reboiler return 70. Liquid flowing through downcomers 22 of the de-entrainment device 60 bypasses this vapor through conduits 15. The de-entrainment device 60 may alternatively be positioned in other locations within vessel 11 to similarly remove liquid entrained in a feed or in a vapor at any stage of the vessel 11.

Figure 8:
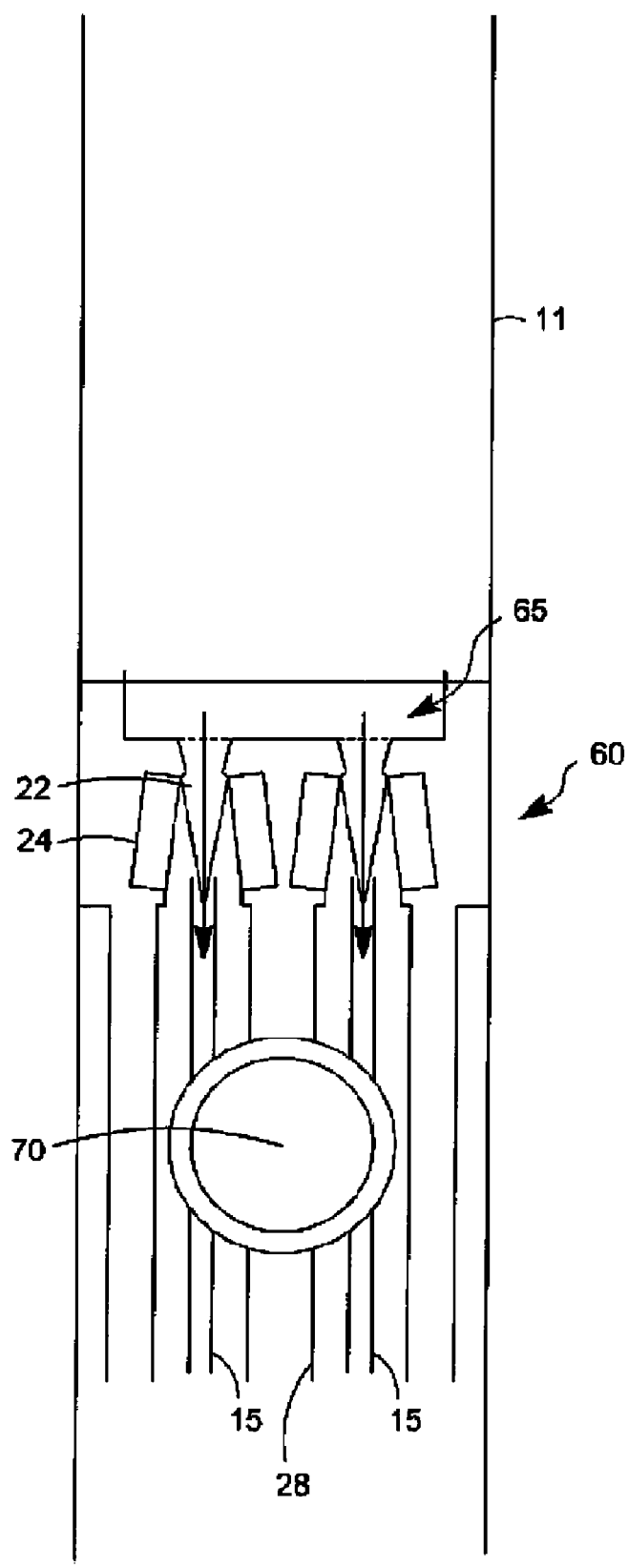
FIG. 8 depicts a distillation column with a de-entrainment device used in combination with a high capacity tray.

FIG. 8 illustrates the use of de-entrainment device 60 in conjunction with other types of vapor-liquid contacting devices such an MD™ tray 65 or, alternatively, an ECMD™ tray or multiple-pass tray 65 that may be positioned in fluid communication with downcomers 22 of de-entrainment device 60 from above.

Overall, aspects of the invention are directed to the use of de-entrainment devices, often in conjunction with contacting modules for carrying out vapor-liquid contacting, and especially co-current contacting modules that provide high capacity and high efficiency and are often associated with high liquid and vapor flows within a vapor-liquid contacting apparatus. The devices may also be used with high capacity trays including MD™ trays, ECMD™ trays or conventional multiple-pass trays. Those having skill in the art will recognize the advantages of the equipment and associated methods described herein and their suitability in other applications. In view of the present disclosure, it will be appreciated that other advantageous results may be obtained. Those having skill in the art, with the knowledge gained from the present disclosure, will recognize that various changes can be made in the above equipment and methods without departing from the scope of the present disclosure. Mechanisms used to explain theoretical or observed phenomena or results, shall be interpreted as illustrative only and not limiting in any way the scope of the appended claims.

The invention claimed is:

1. A de-entrainment device for disengaging entrained liquid, the de-entrainment device comprising a de-entrainment stage having at least one de-entrainment module comprising:
   a) at least one downcomer integral with, or having an outlet proximate, a conduit bypassing a de-entrainment flow channel;
   b) a demister having an inlet surface proximate said de-entrainment flow channel and an outlet surface superior to a receiving pan; and
   c) at least one duct having an upper end in fluid communication with said receiving pan.

2. The de-entrainment device of claim 1, wherein said downcomer is integral with said conduit.

3. The de-entrainment device of claim 1, wherein said downcomer has an outlet proximate said conduit.

4. The de-entrainment device of claim 3, wherein said downcomer has an outlet within said conduit.

5. The de-entrainment device of claim 1, wherein the conduit extends below said receiving pan.

6. The de-entrainment device of claim 5, wherein the conduit extends below said receiving pan to a depth at least equal to a height of the de-entrainment module from the receiving pan to a top of the demister.

7. The de-entrainment device of claim 1, wherein the downcomer is integral with, or has a plurality of outlets proximate, a plurality of conduits bypassing said de-entrainment flow channel.

8. The de-entrainment device of claim 1, wherein the conduit has a cross-sectional shape that is circular or rectangular.

9. An apparatus for performing co-current vapor-liquid contacting, comprising:
   a lower contacting stage having at least one contacting module and a plurality of receiving pans, said lower contacting module comprising:
   a) a pair of substantially parallel demisters being spaced apart; and
   b) a downcomer located between said demisters and defining, with inlet surfaces of said demisters, a pair of co-current flow channels, wherein said inlet surfaces of said demisters are in fluid communication with said co-current flow channels, said downcomer has an outlet in fluid communication with said co-current flow channels, and said demisters have outlet surfaces superior to separate receiving pans of said plurality of receiving pans; and
   wherein each receiving pan has at least one duct, with each duct of one receiving pan providing fluid communication to a downcomer of a de-entrainment module of a de-entrainment stage having, in addition to said de-entrainment module, a plurality of receiving pans, said de-entrainment module comprising:
   a) a pair of substantially parallel demisters being spaced apart;
   b) a downcomer located between said demisters and integral with, or having an outlet proximate, a conduit bypassing a pair of de-entrainment flow channels, wherein
      (i) said inlet surfaces of said demisters are in fluid communication with said de-entrainment flow channels,
      (ii) said demisters have outlet surfaces superior to separate receiving pans of said plurality of receiving pans of said de-entrainment stage,
      (iii) each receiving pan has at least one duct.

10. The apparatus of claim 9, wherein said lower contacting module is in non-parallel alignment with respect to said de-entrainment module.

11. The apparatus of claim 9, wherein said downcomer of said de-entrainment module is integral with said conduit.

12. The apparatus of claim 9, wherein said downcomer of said de-entrainment module has an outlet proximate said conduit.

13. The apparatus of claim 12, wherein said downcomer of said de-entrainment module has an outlet within said conduit.

14. The apparatus of claim 9, wherein said conduit extends below said plurality of receiving pans of said de-entrainment stage.

15. The apparatus of claim 14, wherein the conduit extends below said plurality of receiving pans of said de-entrainment stage to a depth at least equal to a height of said de-entrainment module from said plurality of receiving pans of said de-entrainment stage to a top of said demister of said de-entrainment module.

16. The apparatus of claim 9, wherein said downcomer of said de-entrainment module has an outlet integral with, or has a plurality of outlets proximate, a plurality of conduits bypassing said de-entrainment flow channels.

17. The apparatus of claim 9, wherein the conduit has a cross-sectional shape that is circular or rectangular.

* * * * *